(12) United States Patent
Nguyen et al.

(10) Patent No.: US 7,562,387 B2
(45) Date of Patent: Jul. 14, 2009

(54) METHOD AND APPARATUS FOR SELECTIVE DISABLING OF TRACKING OF CLICK STREAM DATA

(75) Inventors: Bing Quang Nguyen, Cary, NC (US); Mary Catherine Streble, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 09/949,364

(22) Filed: Sep. 7, 2001

(65) Prior Publication Data

US 2003/0051157 A1    Mar. 13, 2003

(51) Int. Cl.
*H04L 9/00* (2006.01)
(52) U.S. Cl. ....................................................... 726/22
(58) Field of Classification Search ................. 713/201, 713/172; 705/1; 726/22
See application file for complete search history.

(56) References Cited

U.S. PATENT DOCUMENTS

| | | | | |
|---|---|---|---|---|
| 6,085,224 | A * | 7/2000 | Wagner | 709/203 |
| 6,122,661 | A | 9/2000 | Stedman et al. | 709/217 |
| 6,128,738 | A | 10/2000 | Doyle et al. | 713/185 |
| 6,490,601 | B1 * | 12/2002 | Markus et al. | 715/507 |
| 6,532,459 | B1 * | 3/2003 | Berson | 707/3 |
| 6,581,072 | B1 * | 6/2003 | Mathur et al. | 707/104.1 |
| 6,851,060 | B1 * | 2/2005 | Shrader | 726/10 |
| 6,944,766 | B2 * | 9/2005 | Hamada | 713/182 |
| 6,959,420 | B1 * | 10/2005 | Mitchell et al. | 715/745 |
| 7,103,656 | B2 * | 9/2006 | Lewis et al. | 709/223 |
| 2001/0049620 | A1 * | 12/2001 | Blasko | 705/10 |
| 2002/0143770 | A1 * | 10/2002 | Schran et al. | 707/10 |
| 2002/0156917 | A1 * | 10/2002 | Nye | 709/238 |
| 2005/0187786 | A1 * | 8/2005 | Tsai | 705/1 |
| 2005/0250440 | A1 * | 11/2005 | Zhou et al. | 455/12.1 |
| 2007/0038765 | A1 * | 2/2007 | Dunn | 709/229 |

FOREIGN PATENT DOCUMENTS

WO     WO00/23932     4/2000

OTHER PUBLICATIONS (COPPA) Children's Online Privacy Protection Act of 1998.*
"So you want a Cookie, Huh?" Burns, www.htmlgoodies.com, 1999.*
"Childrens Online Privacy Protection Rule; Final Rule" Nov. 1999, FTC.*
"The Single-Pixel GIF Trick", www.dsiegel.com/tips/wonk5/single.html, Mar. 14, 1996.*

* cited by examiner

*Primary Examiner*—Andrew L Nalven
(74) *Attorney, Agent, or Firm*—Saul Ewing LLP

(57) ABSTRACT

The invention is a method and apparatus for gathering click stream information from Web surfers while maintaining their privacy. In accordance with the invention, a Web site that collects click stream information provides an opportunity for visitors to choose not to have personal information gathered about them. If a person chooses not to have personal information gathered, the Web site continues to collect click stream information about the visitor's progress through the Web site as before by the use of cookies and/or URL rewriting, for instance, using Single Pixel technology, in which the client machines are made to send requests to a usage analyzer having cookies bearing the relevant click stream data. However, the cookies include an extra field called a privacy flag. If the visitor chooses not to have personal information gathered, the flag is set. Otherwise it is reset. The usage analyzer software checks the privacy flag in the cookie of each request it receives and, if the flag is set, replaces the data in any field of the corresponding log entry containing personal information with a default value. Accordingly, the Web site operator can continue to gather click stream information from visitors without collecting personal information.

17 Claims, 3 Drawing Sheets

METHOD AND APPARATUS FOR SELECTIVE DISABLING OF TRACKING OF CLICK STREAM DATA

FIELD OF THE INVENTION

The invention pertains to the collection by Web site operators of information about Web site usage by individuals. More particularly, the invention pertains to the collection of information relating to users' identities in such environments.

BACKGROUND OF THE INVENTION

The Internet is a vast collection of computing resources, interconnected as a network, from sites around the world. It is used every day by millions of individuals. The World Wide Web (referred to herein as the "Web") is that portion of the Internet that uses the Hyper text Transfer Protocol ("HTTP") as a protocol for exchanging messages. (Alternatively, the "HTTPS" protocol can be used, where this protocol is a security-enhanced version of HTTP.)

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: a search facility to search throughout the interconnected computers of the Internet for files of interest to the user; a browse capability for displaying information files located with the search facility; and an electronic mail facility, with which the user can send and receive mail messages from other computer users.

The HTTP communications protocol uses a request/response paradigm, where the electronic messages sent between communicating computers can be categorized as either requests for information or responses to those requests.

The user working in a Web environment will have software running on his or her computer to allow him or her to create and send requests for information onto the Internet, and to see the results. These functions are typically combined in a software package that is referred to as a "Web browser", or "browser". After the user has created a request using the browser, the request message is sent out into the Internet (typically, via an ISP as described above). The target of the request message is one of the interconnected computers in the Internet network. That computer receives the message, attempts to find the data satisfying the user's request, formats that data for display with the user's browser, and returns the formatted response to the browser software running on the user's computer.

This is an example of a client-server model of computing, where the computer at which the user requests information is referred to as the client or client machine, and the computer that locates the information and returns it to the client is the server or server machine. In the Web environment, the server is referred to as a "Web server".

Content on the Internet is served in individual files in the form of HTML pages. HTML (Hyper Text Markup Language) is a Web content formatting language specifically designed for a distributed network such as the Internet. An HTML page contains HTML code, which indicates how the information content is to be displayed, as well as at least some of the actual content. Pages also typically contain references to other files where at least some of the content is contained.

Web browser software is designed to issue requests for pages in the form of URLs (Universal Resource Locators). A URL essentially is an address of a file that is accessible through the Internet. The URL includes the name of the file that is being requested and the IP (Internet Protocol) address of the server on which it is to be found.

A user at a client machine may type a URL into an appropriate field in a GUI (Graphical User Interface) generated by the Web browser software in order to address Web pages. Another way of addressing Web pages is by hyperlinking. A hyperlink is a portion in one Web page, such as a portion of text or an image, that, when selected (such as by positioning a cursor over that portion and pressing a button on the cursor control device), automatically addresses another Web page. Thus, for example, by manipulating one's mouse to cause the screen cursor to move over a hyperlink and clicking, the page addressed by that hyperlink is accessed by the browser.

Each request is routed through the Internet to the server identified in the URL. That server then returns the requested page through the Internet to the client machine that requested it. The Web browser software reads the HTML code in the page and, if that page contains references to other files containing some of the content, the browser software sends further requests for those files. It displays the content (whether contained directly in the HTML page or in another file referenced within the HTML page) in a manner dictated by the HTML code in the page.

Countless commercial, educational, government and other institutions operate servers containing HTML pages that are accessible to client machines via the Internet. The term "Web site" generally refers to a collection of HTML pages that are maintained on (or generated on-the-fly by) one or more servers by or on behalf of a single entity and that are related to each other in some fashion.

HTTP does not provide for maintaining any type of state information about the communications, instead treating each request/response pair as a separate and unrelated transaction. However, there are many cases for which it is desirable to associate multiple HTTP requests from a client to a server with each other so as to be able to maintain state information.

One example scenario where state information is an absolute necessity is on-line shopping, including the gathering of user profile information. In on-line shopping, a user typically accesses a seller's on-line catalog, which will be displayed to the user as some number of Web pages. Typically, the user can display a separate page of information related to each product, to read about the details of that product. Typically, each time the user requests to see a page, a separate HTTP request is sent to the Web server where the seller's product catalog is stored. When the user wishes to order a product, he indicates his selection by clicking on an "Order" button of some type using a mouse, for example. This causes another request message to be sent to the server, where the request indicates that this is an order for the particular item.

Without the ability to maintain state information, each of these requests would be treated as unrelated to the others. There would be no efficient way to collect orders for more than one item into one large order. Further, there would be no efficient way to allow the user to enter his name, address, credit card number, etc. only one time, and have that information apply to all the ordered items.

Even further, it also frequently is desirable to be able to maintain state information across multiple, separate, visits by a particular individual to a particular Web site. For instance, it may be desirable for a retail Web site to store all of the information that it typically gathers to process a purchase order by an individual and associate that information with the individual every time he or she visits the Web site. Then the individual will not need to re-enter the same information, such as name, credit card No., billing address, shipping address, etc., every time he or she visits the Web site and purchases an item.

Accordingly, ways have been developed outside of the HTTP protocol itself for maintaining such state information. One of the earliest ways developed for doing this was the use of cookies.

Cookies are small data files that a server might send to a client machine and that the client's Web browser knows to store in a designated cookie folder. A cookie contains pertinent information about the user as well as information that the browser uses to determine the particular Web site (i.e., URL) to which the cookie pertains. Thereafter, when that client machine sends a HTTP request for a Web page meeting the URL criteria set forth in the cookie, the client's Web browser software includes that cookie in the request. The purpose of cookies is to inform a server of relevant information about the particular user (or at least the particular client machine that issued the request). Cookies might contain any particular information that a Web site operator feels the need to have in order to better service its customers.

URL rewriting is a technology that can serve most of the same functions as cookies for situations in which cookies are disabled on a particular client machine or if cookies are otherwise undesirable or impossible to use. Briefly, in URL rewriting, the data that would have been contained in a cookie is appended to the end of the URL in the request. URL rewriting and particularly its use as a substitute for cookies is well known in the art.

Large Web site operators may own their own server (or a server farm comprising multiple servers) dedicated to a single "Web site". On the other hand, smaller Web site operators may farm out maintenance of their Web sites to other companies that might support multiple Web sites on a single physical server machine. These companies are commonly called Web hosts or Web hosting companies.

Many Web site operators, and particularly commercial Web site operators, have a desire to identify and attract as many persons as possible with an interest in the particular subject matter of the Web site as often as possible. One step that typically is necessary to achieve this goal is to collect personal information about the individuals that visit the Web site. Such information provides at least two avenues of attracting visits. First, personal information such as e mail address, mailing address and telephone number enable the Web site operator to contact the individual with advertising or other information of interest. Secondly, a collection of demographic information about a large number of visitors to the Web site may enable a Web site operator to determine demographics of its target audience and thus better target advertising or other information to persons with similar demographic profiles.

Personal information can be collected by asking visitors to the Web site to provide personal information in an online form or questionnaire.

The same type of personal and demographic information about individuals that visit other Web sites that have similar focuses as (or focuses that are known to have a high demographic cross-correlation with) the focus of the particular Web site also can be useful in targeting advertising towards those individuals.

Many companies are willing to sell or otherwise share the personal information it gathers about visitors to its Web site with other companies.

Another aspect of attracting and keeping customers is making Web sites as convenient and attractive to users as possible so that they will be more inclined to return to the Web site. Accordingly, many Web site operators have a strong desire to keep track of the ways in which individuals utilize the Web site in order to determine which aspects of a Web site users like or dislike. Useful information in terms of making such determinations include things such as (1) from what other Web sites users have hyperlinked to your Web site, (2) which pages on your Web site receive the most and/or fewest hits, (3) how long users tend to view a particular page, (4) on which pages users have entered the Web site, (5) from which pages users have exited the Web site (to go to another Web site or log off the Internet altogether), and (6) the particular browser software used by visitors. This type of data is commonly termed click stream data.

Traditional log file analysis techniques can be used to gather click stream data of users of a particular Web site to develop a log of data indicating the page (or resource) requests made by Web site users in order to collect some of the aforementioned useful information.

As is well known to those of skill in the art of Web site design and Web hosting, cookies are used extensively in gathering and tracking such information. For instance, a cookie identifying the particular user (or at least the particular client machine) can be included in each request, thus allowing tracking of one's progress through a Web site. The same objectives can be accomplished using URL rewriting.

A technology called "Single-Pixel" technology has been developed that can be used to gather information similar to the information gathered through traditional log file analysis. With Single-Pixel technology, tags can be embedded in an HTML page that cause the browser at the client machines that receive that page to send click stream information in the form of cookies (or rewritten URLs) to a click stream analysis (also called a usage analyzer) engine on a server on the Web. That server typically is (but need not be) a separate server from the server of the particular Web site that is serving the content responsive to the client machine's requests. Other methods also are known for sending Single-Pixel data for collecting click stream information. Such other methods include query string parameters and hidden form data. The usage analyzer engine maintains a log containing information for each request it receives. The log entries can be analyzed and correlated to derive the aforementioned type of information.

Web hosting companies are particularly interested in click stream and other Web site usage information and often share such information gathered with respect to each of the companies to which it provides Web hosting services (i.e., its customers) with all of its customers.

Many individuals who use the Internet find this sort of gathering of personal information and Web surfing habits about themselves offensive or do not want such information about them to be gathered.

Accordingly, it is an object of the present invention to provide an improved method and apparatus of gathering click stream information.

It is another object of the present invention to provide a method and apparatus for gathering click stream information while preserving the privacy of the individuals from whom the information is gathered.

SUMMARY OF THE INVENTION

The invention is a method and apparatus for gathering click stream information from Web surfers while still maintaining their privacy. In accordance with the invention, a visitor to a Web site that collects click stream information provides an opportunity to visitors to choose not to have personal information gathered about them. If a person chooses not to have personal information gathered, the Web site can continue to collect click stream information about the visitor's progress through the Web site by the use of cookies and/or URL rewriting, including the use of Single Pixel technology as before, except that the cookie, query parameters, or form data includes an extra field called a privacy flag. If the visitor chooses not to have personal information gathered, the flag is set. Otherwise it is reset. Alternately, the mere presence of a privacy flag can be used to indicate a request for privacy. The usage analyzer engine checks the privacy flag in the data of each request it receives and, if the flag is set, it replaces the data in any field of the corresponding entry in the click stream log that contains personal information with a default value. Accordingly, the Web site operator can continue to use cookies and Single Pixel technology to gather click stream information from visitors, including demographic information, without collecting personal information.

DETAILED DESCRIPTION OF THE INVENTION

Figure 1:
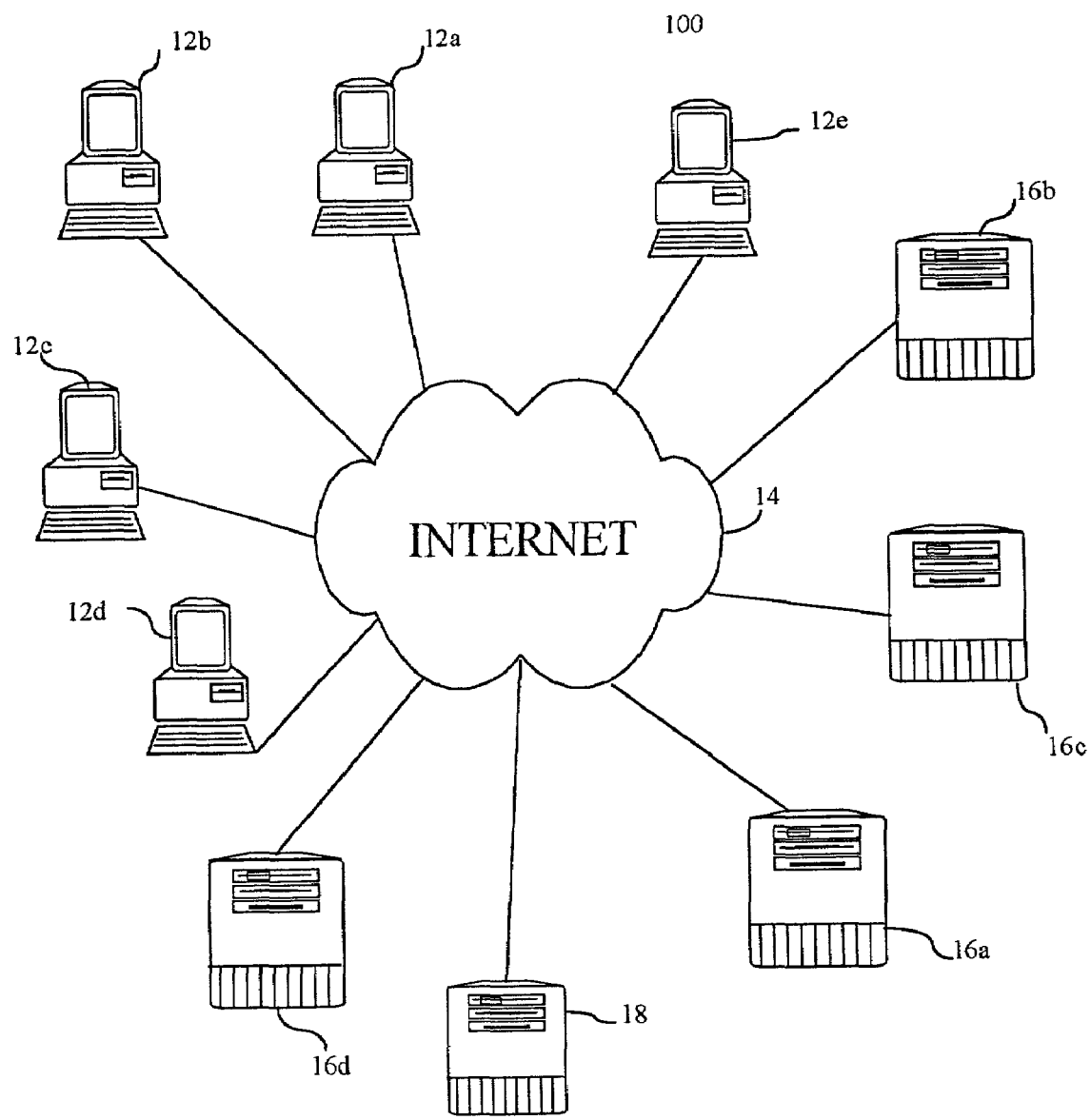
FIG. 1 is a block diagram illustrating the basic components involved in the practice of the present invention in connection with a distributed network.

FIG. 1 is a block diagram of a network, such as the Internet, in which the present invention can be implemented. The network is shown as blob 14 and comprises a series of interconnected computers, routers and switches (not shown) that essentially allow any computer on the network to communicate with any other computer on the network. Computers 12a through 12e are client computers that issue requests via the Internet to server machines on the Internet. Computers 16a through 16d are servers that serve information to client machines responsive to requests received from those client machines via the Internet. Those of skill in the art will understand that some Web site operators maintain a plurality of servers (sometimes called a server farm) for a single Web site. On the other hand, other companies, such as Web hosting companies, maintain multiple Web sites for multiple customers on a single server. However, in order not to obfuscate the invention, we shall assume that each server 16a-16d is operated by a single Web site operator in this discussion.

Let us assume that server 16a supports a large commercial Web site that offers for sale all forms of electronic equipment, including computers, audio products, televisions and other video products, software, printers, and accessories for all of the above. Let us also assume that the Web site operator wishes to collect click stream information as well as personal information from its visitors. The Web site utilizes cookies and/or URL rewriting and Single-Pixel technology in a manner well known in the prior art to collect click stream information from its visitors. Personal information also is gathered in the usual manner, including the use of electronic forms in which the user is requested to provide such information. Even if the Web site does not have such a form for all visitors, any visitor who has purchased anything through the Web site had to have provided such information at the time of purchase in order to complete the purchase. The Web site operator can associate the personal information with the click stream data either by embedding the personal information directly within the cookies sent to the client machines' cookie folder or by placing a unique ID in those cookies, which ID can be later associated with the user's personal information maintained locally by the Web site operator. In either event, the click stream data is sent to a usage analyzer software engine on a separate server 16b. As previously mentioned, with Single-Pixel technology, tags are embedded in the HTML pages of the Web site that cause the browsers at the client machines that receive the pages to send click stream information in the form of cookies, URL parameters, hidden form data, etc. to the usage analyzer server 16b.

Thus, the log generated by the usage analyzer will either directly contain personal information or contain user IDs from which it will be possible to retrieve the personal information.

However, in accordance with the present invention, the user ID and/or personal information contained in the log can be eliminated, either automatically for all log entries or only for those log entries for which the corresponding user has indicated a desire to block personal information.

It generally will not be practical to eliminate personal information from cookies, especially the cookies used in connection with the gathering of click stream information through the usage analyzer engine. Specifically, it is generally necessary to maintain some state information so that individual requests from a single client machine can be associated with each other at the Web site. As previously described, this usually is necessary to provide a satisfying web surfing experience for visitors and is an absolute necessity for essentially any type of transaction, such as sales transactions. Thus, in accordance with the invention, in the log created and maintained by the usage analyzer engine, any fields of information in a received cookie deemed to comprise personal information are overwritten with a default value that contains no personal information about the visitor (or client machine) from which it was received. The overwriting can be applied to any field or type of information in the entry. Accordingly, the term "personal information" as used herein essentially can be whatever information the Web site operator or user deems it to be. In fact, the invention can be applied to any type of information and is not necessarily restricted to blocking "personal information".

In a simple embodiment of the invention in which a Web site operator simply does not wish to maintain personal information in the usage analyzer about any of its users, the overwriting described above can be applied to every log entry. In such an embodiment, there would be no need for a privacy flag or the like. However, in a more practical embodiment of the invention, each visitor to the Web site is given an opportunity to read the Web site's privacy policy statement. In that policy statement, the user is given at least two options, namely, to allow the Web site to apply its basic privacy policy in connection with information gathered from that user or to select an enhanced privacy level in which certain types of information about the user are not collected. If the user selects the enhanced privacy level, then a scheme in accordance with the present invention is utilized to rewrite fields in the log with default data containing no identity information. One way of implementing this aspect of the invention is to include in the cookies that the Web site sends to the browsers of its visitors an additional, "privacy flag" field. The privacy flag can be a one bit field which, when in a first condition (e.g., logic 0) denotes that the visitor has not requested enhanced privacy and when in a second condition (e.g., logic 1) denotes that the visitor has requested enhanced privacy. In an alternate embodiment, a request for enhanced privacy might be indicated by the presence of the privacy flag, whereas the absence of the privacy flag indicates that the users has not requested enhanced privacy.

It should be understood that the Web site operator may offer more than two levels of privacy. Each increasing privacy level translating into additional fields of data that will be overwritten with default values. In such cases, the flag would need to be more than one bit wide in order to denote which of the multiple privacy levels for which a visitor has opted.

In any event, when the usage analyzer engine receives cookies, it parses them to retrieve the click stream and/or other information that will be placed in the corresponding log entry. As part of the parsing, it encounters the privacy flag, determines its condition and, depending on its condition, overwrites one or more fields in the log entry with default data that does not contain any personal information.

In this manner, those users requesting a certain level of privacy, can have that privacy while still allowing the Web site operator to collect as much other information as it desires. For instance, if we consider a simple example in which the only "personal information" in the cookie is a user ID, that field can be replaced with a default field yet the logged entry will still contain the useful click stream information (as well as all other information that may have been in the cookie). Thus, the Web site operator still can gather click stream and/or demographic information from all visitors without gathering actual personal information. Thus, the Web site operator will still be able to obtain useful information such as the other Web sites from which visitors tend to arrive at the present Web site, the pages of the Web site where users tend to enter and exit, the manner in which user's tend to progress through the Web site, the pages of the Web site that receive the most hits, the pages of the Web site that receive the fewest hits, etc.

Figure 2:
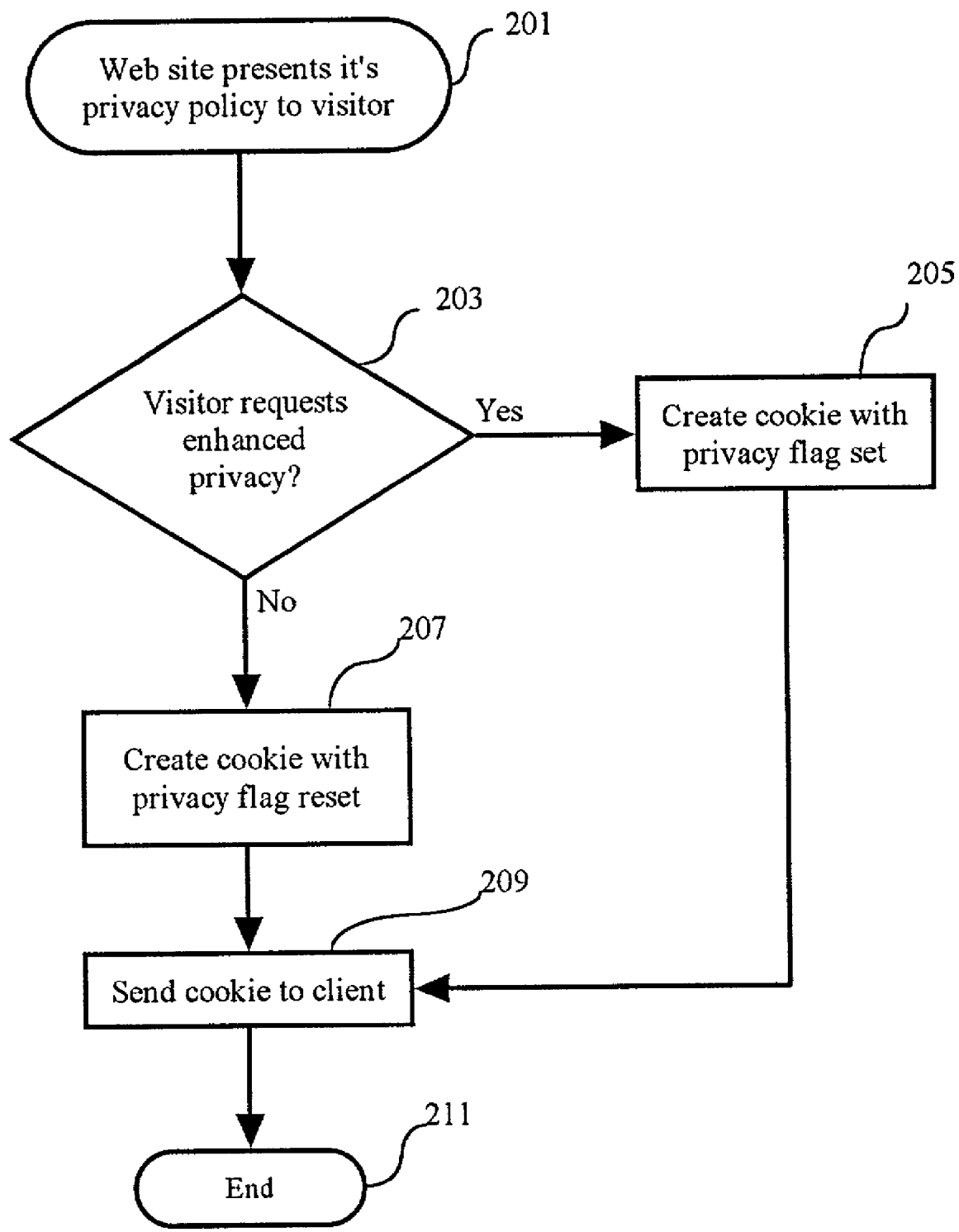
FIG. 2 is a flow diagram illustrating steps performed in accordance with one aspect of the present invention.
Figure 3:
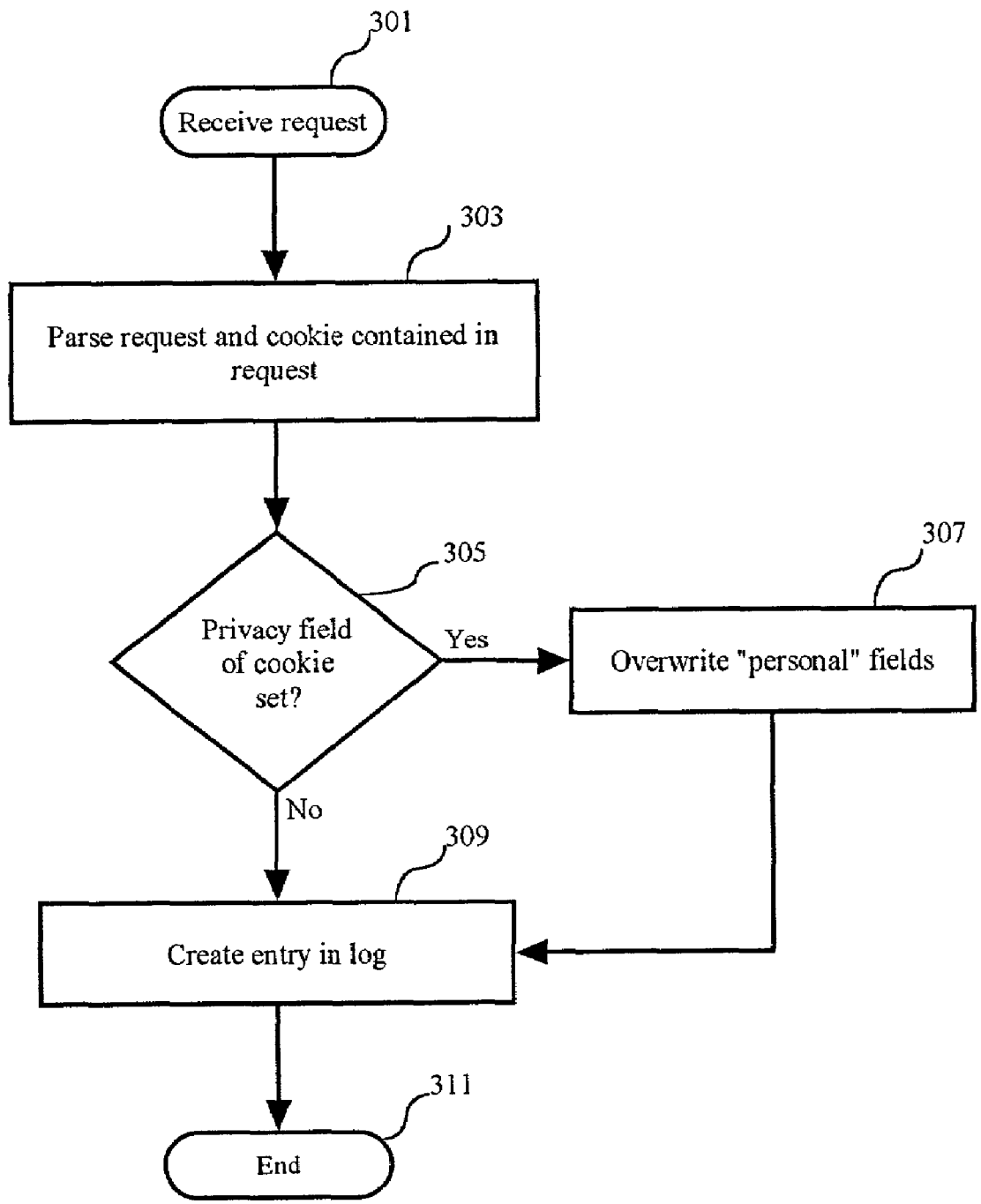
FIG. 3 is a flow diagram illustrating steps performed in accordance with another aspect of the present invention.

FIGS. 2 and 3 are flow diagrams illustrating a process in accordance with the present invention. It should be apparent from the preceding discussion that implementation of the invention involves steps carried out at potentially three different computers coupled by the network, namely, the Web site server, the client machine, and the usage analyzer server. The Web site server and the usage analyzer server, of course, may or may not be the same physical computing device. Further, it will be understood that, while the client machines participate in the execution of the overall process, the client machines require no modification whatsoever to participate in the process of the present invention. In essence, the only difference at the client machine is the contents of the messages (e.g., cookies or URLs) that it receives from the servers. More particularly, the cookies may contain an extra field, namely, the privacy flag field.

FIG. 2 illustrates steps performed at the Web site server, which are the steps relating to the determination and setting of a privacy level. The process is entered at step 201. The Web site operator has any number of options for how and when this routine is entered. For instance, it may be entered whenever a visitor first visits a Web site (as, for instance, determined by the lack of a cookie pertaining to this Web site contained in the request). Alternately, the user would have to navigate to the privacy policy of his own volition. Whatever the manner in which it is reached, the Web site presents its privacy policy to the user in step 201 wherein the user is given the option to designate a desired privacy level. In this example, let us assume that there are only two options. In step 203, it is determined whether the user has requested enhanced privacy or not. If the user requests enhanced privacy, flow proceeds to step 205 where a cookie containing whatever information the Web site deems desirable is created. The cookie includes a privacy flag with that privacy flag being set to indicate enhanced privacy. If the user does not request enhanced privacy, flow instead proceeds from step 203 to step 207, where the same cookie is created except that the privacy flag is set to no enhanced privacy. Then, from either step 205 or step 207, flow proceeds to step 209 where the cookie is sent to the user. The process ends at step 211.

FIG. 3 is a flow diagram illustrating the processing within the usage analyzer engine pertaining to the present invention. In step 301, the usage analyzer engine receives a request from a client machine comprising click stream and/or other data in accordance with Single-Pixel technology. In step 303, the usage analyzer engine parses the request and the cookie contained in the request. In step 305, it determines whether the privacy field of the cookie is set to enhanced privacy. If the cookie is set to enhanced privacy, flow proceeds to step 307 where the personal information fields(s) of the cookie are overwritten with default data. Flow then proceeds to step 309, where an entry is created in the log corresponding to that request.

If the privacy field in the cookie is not set to enhanced privacy, flow simply proceeds from step 305 directly to step 309, where the entry is created in the log with the original data in the personal information fields. The process ends at step 311.

As is well known, all requests issued by client machines include as part of the request an IP address of the requesting client machine. In the case of client machines that access the Internet through an ISP, the client machine is assigned a new IP address each time it logs on to the Internet through the ISP. Client machines that have a more direct connection to the Internet typically have a single IP address that does not change. In either event, the IP address of the client machine can be considered personal information. For instance, even in the case of client machines that access the Internet through an ISP, the ISP may maintain records through which the IP address can be correlated to a particular individual or client machine. Accordingly, the present invention can also be applied to the IP address contained in the request. More particularly, if the Web site operator includes an IP address field in its log at the Usage Analyzer server, that information can be overwritten with default data if the user selects enhanced privacy. Alternately, in those embodiments of the invention in which the Web site operator universally does not collect certain types of private information, the IP address field can be overwritten with default data in all of the log entries.

While the invention has heretofore been described in connection with the Internet and the Web, it is applicable to any network environment in which client machines coupled to said network request network resources (files) from servers coupled to said network.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of collecting click stream data about usage of a Web site by a user who visits said Web site via the Internet using a client machine while enhancing privacy of said user, said method comprising the steps of:

said Web site providing said user an opportunity to designate a desire that certain click stream data about said user not be collected;

said Web site receiving said designation from said client machine;

responsive to receipt of said designation, said Web site instructing said client machine to include said designation in subsequent requests from said client machine pertaining to said Web site; and responsive to receipt of requests from said client machine containing said designation, said Web site replacing said certain data with other data.

2. The method of claim 1 wherein said instructing step comprises sending a cookie to said client machine including a data item disclosing said designation.

3. The method of claim 1 wherein said instructing step is performed using URL rewriting.

4. The method of claim 1 further comprising the step of:

said Web site including an instruction in pages sent to said client machine instructing that client machine to include said designation in said requests.

5. The method of claim 4 wherein said certain click stream data comprises information from which the identity of said user can be determined.

6. A method of collecting click stream data about usage of Web sites by users of said Web sites who visit said Web sites using client machines while enhancing privacy of said users, said method comprising the steps of:

providing said users an opportunity to choose between at least first and second privacy levels, said first privacy level indicating that at least a first click stream data item about said user not be collected and said second privacy level indicating that said first click stream data item may be collected;

sending cookies to said users' client machines, each said cookie including a plurality of data items, including, at least, said first click stream data item and a second data item, said second data item comprising said privacy level designation, said cookie to be included in requests issued by said client machine that meet certain criteria;

including in HTML pages sent to said client machines instructions for those client machines to send a request to a designated server, said request including said cookie;

receiving said requests at said designated server;

parsing said requests to determine which of said first and second privacy levels is designated;

with respect to requests designating said first privacy level, storing data items from said cookie in a memory and replacing said first click stream data item of said cookie with other data; and with respect to requests designating said second privacy level, storing data items from said cookie in a memory without replacing said first click stream data item of said cookie.

7. The method of claim 6 wherein said designated server generates log files to track said click stream data.

8. The method of claim 6 wherein said second data item comprises information from which the identity of said user can be determined.

9. The method of claim 6 wherein said second data item comprises a user ID.

10. The method of claim 6 wherein said second data item comprises an IP address.

11. A computer program product embodied on a computer readable medium for collecting click stream data from client machines coupled to a network, said client machines sending requests to a server coupled to said network, said requests containing user identification data and said click stream data, said computer program product comprising:

first instructions for receiving and parsing said requests to identify said user identification data and said click stream data;

second instructions for replacing said user identification data with other data;

third instructions for creating a data entry containing said click stream data contained in said request associated with said other data and not with said user identification data.

12. The computer program product of claim 11 wherein said user identification data comprises a data field in a cookie contained in said request.

13. The computer program product of claim 11 wherein said user identification data is contained in a rewritten URL in said request.

14. The computer program product of claim 11 wherein said user identification data is contained in URL parameter data.

15. The computer program product of claim 11 wherein said user identification data is contained in hidden form data.

16. The computer program product of claim 11 wherein said requests further comprise a privacy level designation, said privacy level designation indicating at least whether or not said user identification data should be maintained by said computer program product, said computer program product further comprising:

fourth instructions for identifying said privacy level designation; and fifth instructions for bypassing said third instructions if said privacy level designation indicates that said computer program product should maintain said user identification data.

17. A method of collecting data about usage of network server resources by a client machine while enhancing privacy of users of said client machines, said method comprising the steps of:

providing said users an opportunity to designate that said user desires that certain data about said usage of network server resources by said user not be collected;

receiving said designation from said client machine;

responsive to receipt of said designation, instructing said client machine to include said designation in subsequent requests for network server resources; and responsive to receipt of requests from said client machine containing said designation, replacing said certain data with other data.

* * * * *